June 30, 1953 — P. H. WHITE, JR — 2,643,748

MAGNETIC FLUID COUPLING DEVICE

Filed Dec. 19, 1949

Inventor,
Paul H. White, Jr.;
By Frederick E. Maynard,
Attorney.

Patented June 30, 1953

2,643,748

UNITED STATES PATENT OFFICE 2,643,748

MAGNETIC FLUID COUPLING DEVICE

Paul H. White, Jr., Los Angeles, Calif.

Application December 19, 1949, Serial No. 133,723

12 Claims. (Cl. 192—3.2)

This invention is a means and method for the transfer of energy in various types of machines in which there is used a fluid momentum body driven in a circuit by a driving impeller to translate kinetic energy of the fluid body into motion of a driven runner.

There are numerous successful forms of machines employing a confined circulated fluid, such machines, for instance as hydrokinetic or fluid couplings and variations thereof such as fluid-drive torque converters.

Such fluid drive machines are known to have an operational slip as between the driving impeller and the driven runner, and, further, they cannot effect a positive or non-slipping direct drive between these two elements because of low viscosity of the momentum fluid.

It is not desirable for several reasons to utilize a fluid having, normally, high viscosity, but it is desirable that the viscosity may be instantly varied or increased at times to reduce slip, and, in fact, it is desirable to raise the viscosity of the power transferring fluid to practical solidity, as when a positive direct drive is to be established.

It is, therefore, a purpose of this invention to provide a simple, practical, low cost, highly efficient, compact, reliable method and means, based upon the principle of magnetic flux, to and which will so influence the momentum fluid as to vary its viscosity and, if desired, to substantially solidify it so as to constitute a positive coupling medium between a given input element, such as an impeller, and a cooperative driven element, such as a rotative runner, from which output power is delivered for ultimate function. An especially useful field for the instant invention is in the drive train of many kinds of self-propelled vehicles—road vehicles particularly.

This invention consists in certain advancements in this art as set forth in the ensuing disclosure and has, with the above, additional objects and advantages as hereinafter developed, and whose constructions, combinations, and subcombinations and details of means, and the manner of operation and the method will be made manifest in the following description of the herewith illustrative embodiment; it being understood that modifications, variations, adaptations and equivalents may be resorted to within the scope, spirit and principles of the invention as is claimed in conclusion hereof.

Figures 1, 2:
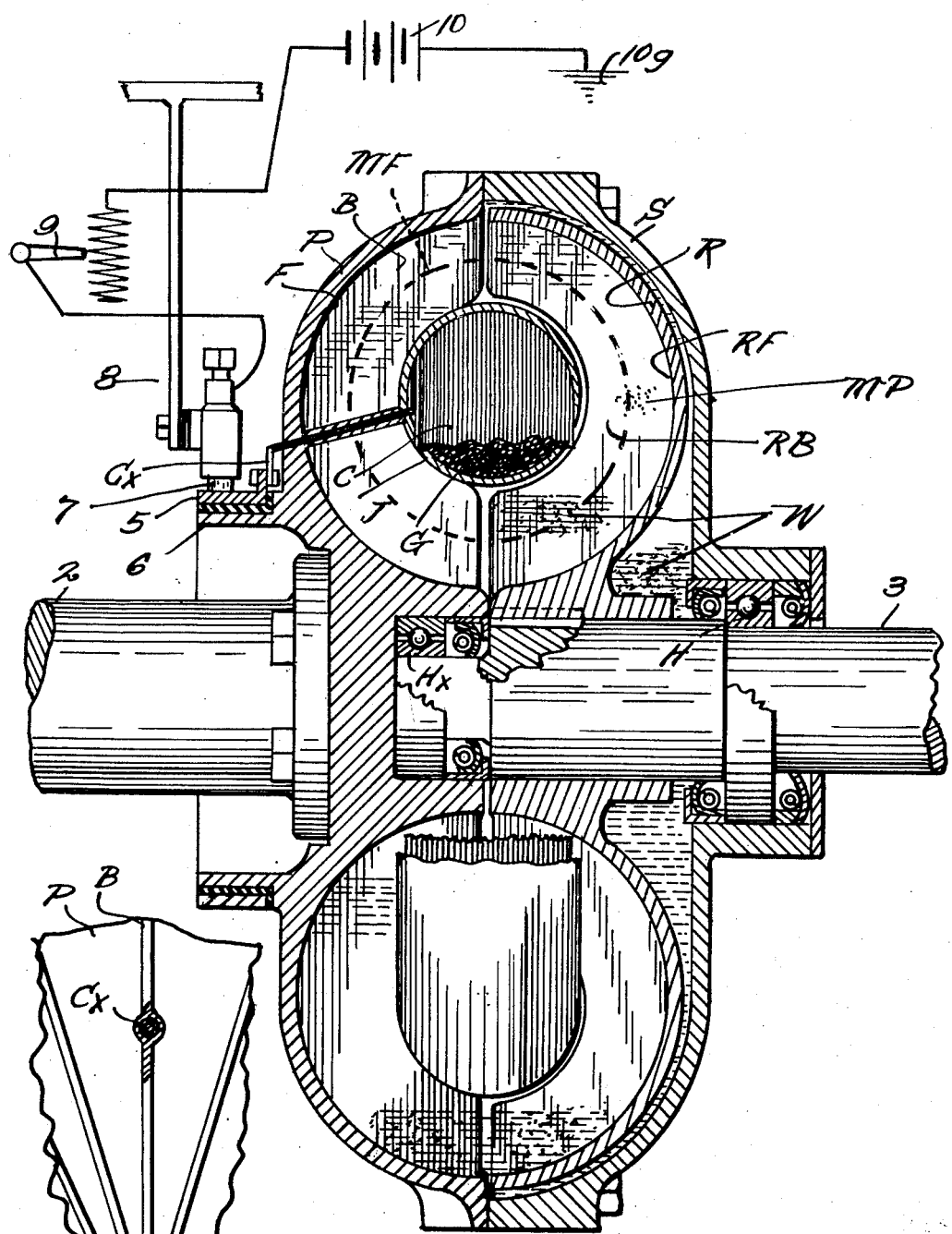
Figure 1 is a diametric section and diagrammatic hook-up of one type of hydrokinetic (or fluid coupling) machine.
Figure 2 is a detail view in elevation showing one blade of an element of the machine and through which an insulated lead extends from a related electromagnet.

It is to be noticed that my invention resides fundamentally in the utilization of magnetic flux, from any appropriate and effective source, such as a permanent magnet (natural or manufactured) or a suitable and adaptable electromagnet coil whereby to magnetically excite the fluid body which has the purpose, by its transit of a closed orbit, to apply its kinetic energy of momentum (as a fluid flywheel) to a power output element, such as a runner in a fluid coupling, or in a torque converter.

The invention is illustrated here in one concrete form of utilization involving an impeller P deriving power from any suitable agent, for instance the shaft 2 of a prime motor. This impeller has an annular, concaved, inner wall face F forming a lateral annular pocket which is radially subdivided by a desired number of impeller blades B of generally radial position from the hub of the impeller, Fig. 2. The shape and arrangement of the blades B are subject to structural variations dependent on given applications. Directly axially opposed to the driving impeller P is a rotative, discal runner R fixed on an output shaft 3 which is supported coaxially with the impeller P in suitable bearings for concurrent rotation, at even or different speeds of rotation. The runner is concaved opposite to the impeller to provide a recessed face RF and it is provided with a system of blades RB.

The recesses at F and RF are of substantially closed circular cross-section, radially of the said shafts and form a closed orbit space about the axis.

Conventionally there is confined in this annular impeller-runner space a hydrokinetic medium or fluid W which, when the impeller P turns, becomes a fluid flywheel transferring energy immediately to the opposed output runner blades RB of the runner R. The runner is outwardly housed by a chamber shell S rigidly fixed to the impeller and has a packed hub bearing H on the shaft 3 which latter has an end bearing Hx in the hub of the impeller.

It is highly desirable to provide in a hydrokinetic coupling—a machine using a fluid flywheel—a flywheel fluid body W whose viscosity can instantly be varied by the imposition thereon of magnetic flux which may be produced, as above stated, from any suitable source and whose force may be varied in influence on the flywheel W, as by relative shift of the respective source or by variation of its flux output.

The method, therefore, includes the step of rendering the fluid flywheel W sensitive to influence of an imposed magnetic flux; this condition being essential. Second, a step in the method is to impose on the sensitive fluid body a magnetic flux of desired intensity, whereby to raise the fluid viscosity to reduce slip between the impeller and the runner and to, if desired, so solidify the fluid flywheel that it will become a substantially solid driving medium from impeller to runner.

For the purpose of thusly sensitizing the fluid body W it is charged with one or another of various fine powders having a desired magnetic property. A powder having an iron component is effective; examples are, finely divided iron powder and finely divided magnetic iron oxide.

To subject this hydrokinetic, magnetic fluid wheel W to a magnetizing influence there is here rigidly affixed preferably to the impeller P an electromagnetic (ring form) coil C concentric to the impeller axis. This coil is suitably encased in a protective jacket J and the contiguous edges of the several blades of the impeller and the runner are sufficiently cut back for placement and clearance of the coil C which is shown as carried by the impeller. One end of the wire forming the coil is grounded to (machine) mass at G, for example, and the other end of the wire is in fixed contact at Cx with a conducting ring 5 insulated from and fixed to an external flange 6 of the impeller P. On this ring 5 bears a terminal brush 7 having a feed wire 8 from a suitable controller such as a rheostat switch 9 which receives current from a suitable source 10 of electrical energy, for instance a battery, grounded to (machine) mass at 10g.

When the coil C is energized it will generate an effective magnetic flux in an approximate field indicated at MF the effect of which will be, according to its variable rheostat control, to set up a magnetic cohesion of the magnetic particles indicated at MP in the fluid flywheel body W, to a degree as needed to increase its viscosity and therefore to reduce fluid slip and increase power output to the runner.

It is clear that the flux intensity may be increased to such a degree that the magnetized fluid flywheel W becomes a substantially solid direct drive medium between the impeller and the runner.

The said fluid will instantly be restored to the normal, de-magnetized, free particle condition of relatively low viscosity when the exciting magnetic flux is removed as by extinction of the energy in the source coil C.

If a permanent magnet is the source it is only necessary to shift it from the excitable magnetic hydrokinetic wheel W.

From this disclosure it will be apparent that I have provided a hydrokinetic machine in which the power transferring momentum body is characterized as magnetic, and in which machine there is a source made effective at will to instantly magnetize said body to a desirable degree to secure a desired decrease of slip to an output element of the machine.

It is a property of the flux sensitive momentum fluid of this coupling machine that either A. C. or D. C. current will be effective to produce the magnetization of the fluid. Further, and importantly, this machine is not to be construed as of a light duty type but is especially intended for heavy loads.

What is claimed is:

1. A rotary coupling machine having, in combination, an input power element and an output power element, a magnetic fluid medium orbitally circulated by the input element against the output element for transferring power from the input to the output element, by kinetic energy of the effective medium whereby to effect controllable positive drive connection of driving and driven rotary elements of the machine when the fluid body is subjected to action of a magnetic field, and in which machine, momentum of said body is the normal transfer-factor between said elements; one of said elements having a circuit controlled magnet whereby to magnetically excite said medium and thereby create a positive mechanical connection of the said elements.

2. A hydrokinetic coupling having a power input impeller and a power output runner, a magnetic fluid body circulated by the impeller and which transfers its momentum energy to the runner whereby to effect controllable positive drive connection of driving and driven rotary elements of the machine when the fluid body is subjected to action of a magnetic field, and in which machine, momentum of said body is the normal transfer-factor between said elements, and a switch controlled magnet fixed to the input element for establishing a magnetic field in which the fluid is caught and changed into a positive connector between the said elements.

3. A hydrokinetic machine having a fluid chamber, a magnetic fluid in said chamber, means for circulating the magnetic fluid in said chamber, and a source from which a magnetic flux can be imposed upon said fluid; said means including normally free coaxial, rotary elements sealed in said chamber and one of which has fluid driving blades and the other fluid driven blades in axial apposition and forming an annular series of fluid pockets and said source including an electric magnet of ring form encompassed by the annular series of pockets.

4. A hydrokinetic machine having a power input element and an opposite power output element, a magnetic fluid body interposed between said elements and the momentum of which, imparted by the first named element normally impositively propels the output element, and a magnetic means driven by one of said elements for subjecting said fluid to an exciting magnetic flux and thereby forming a positive couple between said elements.

5. The machine of claim 4 and means including a switch circuit connected to said magnetic means whereby the magnetic flux effect on the fluid may be varied at will.

6. The machine of claim 4 and which magnetic means is in fixed relation with and is carried by the power input element.

7. A hydrokinetic coupling having, in combination, a power input impeller and an output runner cooperative therewith, means forming a closed chamber in which the runner has motion relative to the impeller, and a magnetic fluid in said chamber and which is given circulation by the impeller so that kinetic energy of the fluid will be imposed on the runner, and means carried by the impeller for magnetizing the fluid at will to form a positive connection between the impeller and the runner.

8. The coupling of claim 7 said magnetizing means consisting of an electromagnetic ring-form coil interposed between the impeller and the runner.

9. The coupling of claim 7 said magnetizing means being an electromagnetic device and a control means connected to said device for regulating flux generation thereof for excitation of the said fluid.

10. The coupling of claim 7 said magnetizing means being an electromagnetic device of annular form between the impeller and the runner, and a control means connected to said device for regulating flux generation thereof for excitation of the said fluid.

11. A hydrokinetic power coupling having, in combination; a shell, axially opposed rotary driving and driven elements mounted in the shell for normal independent rotation relatively, and means in the shell for positively connecting said elements at will and for co-rotation and consisting of a magnetic momentum fluid circulated orbitally in the shell by the rotary driving element to normally drive the driven element, and a controllable electric circuit including a magnet, carried by the driven element, to magnetically rigidify the fluid in the space between the said elements.

12. The coupling of claim 11 said magnet being of ring form and coaxial with the elements and about which magnet the elements have pocket forming blades on which the fluid re-acts during rotation of the elements.

PAUL H. WHITE, Jr.

References Cited in the file of this patent

UNITED STATES PATENTS

| Number | Name | Date |
|---|---|---|
| 2,184,606 | De Lavaud | Dec. 26, 1939 |

FOREIGN PATENTS

| Number | Country | Date |
|---|---|---|
| 599,765 | Germany | June 21, 1934 |
| 789,073 | France | Aug. 12, 1935 |

OTHER REFERENCES

Bureau of Standards Technical Report 1213, March 1948.